(12) United States Patent
Kissel, Jr.

(10) Patent No.: US 8,179,091 B2
(45) Date of Patent: May 15, 2012

(54) METHOD AND APPARATUS FOR PROTECTING CHARGING DEVICES FROM SURGES AND LIGHTNING STRIKES

(75) Inventor: Waldemar F. Kissel, Jr., Gainesville, FL (US)

(73) Assignee: WFK & Associates, LLC, Gainesville, FL (US)

( * ) Notice: Subject to any disclaimer, the term of this patent is extended or adjusted under 35 U.S.C. 154(b) by 432 days.

(21) Appl. No.: 12/548,837

(22) Filed: Aug. 27, 2009

(65) Prior Publication Data

US 2011/0050167 A1 Mar. 3, 2011

Related U.S. Application Data

(63) Continuation-in-part of application No. 12/134,722, filed on Sep. 24, 2008, now Pat. No. 7,906,935.

(60) Provisional application No. 60/942,389, filed on Jun. 6, 2007.

(51) Int. Cl.
| | |
|---|---|
| *H02J 7/00* | (2006.01) |
| *H02J 7/02* | (2006.01) |
| *B62C 1/00* | (2006.01) |
| *B60L 9/00* | (2006.01) |
| *B60K 6/00* | (2007.10) |

(52) U.S. Cl. ........ 320/109; 320/104; 320/116; 320/139; 307/150; 307/152; 278/36; 278/39; 278/87; 180/165

(58) Field of Classification Search ............... 320/109
See application file for complete search history.

(56) References Cited

U.S. PATENT DOCUMENTS

| 3,637,956 | A | 1/1972 | Blackman |
|---|---|---|---|
| 3,914,562 | A | 10/1975 | Bloger |
| 4,139,071 | A | 2/1979 | Tackett |
| 5,323,098 | A | 6/1994 | Hamaguchi et al. |
| 5,359,308 | A | 10/1994 | Sun et al. |
| 5,559,420 | A | 9/1996 | Kohchi |
| 5,669,470 | A | 9/1997 | Ross |
| 5,821,728 | A | 10/1998 | Schwind |
| 6,265,851 | B1 | 7/2001 | Brien et al. |
| 2009/0009131 | A1 | 1/2009 | Kissel, Jr. |

*Primary Examiner* — Yalkew Fantu
(74) *Attorney, Agent, or Firm* — GrayRobinson, P.A.; Michael J. Colitz, III

(57) ABSTRACT

Disclosed is a method and apparatus for charging electrically powered devices. In accordance with the invention, the device is powered by two storage or charge receiving devices. One of these devices is capable of receiving a substantial charge very rapidly while the other device requires a longer time to receive a charge. The advantage is that the powered device can be used almost instantly and continually while at the same time rebuilding electrical charge. The present invention further relates to a system for protecting the charging device from being damaged from an electrical surge, such as from a lightening strike.

5 Claims, 5 Drawing Sheets

METHOD AND APPARATUS FOR PROTECTING CHARGING DEVICES FROM SURGES AND LIGHTNING STRIKES

Cross Reference to Related Applications

This application claims priority and is a Continuation-in-Part of utility application Ser. No. 12/134,722 filed on Sep. 24, 2008 now U.S. Pat. No. 7,906,935 and entitled "Method and Apparatus for Charging Electric Devices," which in turn claims priority to provisional application Ser. No. 60/942,389 Jun. 6, 2007. The contents of both these applications are fully incorporated herein by reference.

BACKGROUND OF THE INVENTION

1. Field of the Invention

This invention relates to a method and apparatus for charging electric devices. More particularly, the present invention relates to a system for powering an electric vehicle that protects against lightening strikes and electrical surges.

2. Description of the Background Art

The use of electrically powered vehicle is known in the art. For example, U.S. Pat. No. 3,637,956 to Blackman discloses an electrical automobile transportation system. The system embodies exposed electrified conductors on the road and electrical current collectors on the vehicle for contacting the road conductors. The electrified conductors supply electrical energy to the vehicle for power.

Another example is U.S. Pat. No. 3,914,562 to Bolger. Bolger discloses an electrically driven vehicle that has suitable batteries to drive the vehicle on conventional roads. The vehicle also has means for receiving power from a conductor embedded in a prepared roadway for driving the vehicle and for charging the batteries.

Another electric vehicle is disclosed in U.S. Pat. No. 4,139,071 to Tackett. Tackett discloses a roadway having a smooth road surface for vehicles and means for transmitting electric current through the road surface to electrically operated vehicles traveling thereon.

Lightning poses a serious problem in all of the referenced systems. Indeed, the damaging effect of a lightening strike, or other power surge, is a major obstacle for any electrically powered vehicle that receives power from either an overhead electric cable or from an electrified rails. If a strong lightning bolt strikes a power supply cable or rail the electric surge can travel for miles and cause damage to both the attached vehicles and to the system of transformers that power the distribution lines.

A continuous electric rail carrying a high charge is an attractive target for lightning. However, by creating intermittent charging stations along a roadway instead of having a continuous electric rail the probability of lightning damage is reduced in proportion to the length of the rail segments.

This is a result of the fact that each unit length of exposed, charged rail has an equal opportunity of being struck by lightning. If, for example, a 5 ft. long rail segment replaces a 10 mile long powered rail then the probability of a lightning strike has been reduced 10,560 times (i.e. 5 ft. divided by 52,800 ft.) This takes place just by using an intermittent rail.

An additional safety measure not present in the referenced inventions is the use of an electrical circuit that is partially opened during the charging process. Namely, the circuit between the vehicle's batteries and the vehicle's capacitors are left opened while the capacitor is charging. This minimizes damage to the charging station and/or vehicle in the event of a lightning strike. Namely, the on board batteries are not charging while the on board capacitors have a direct charging circuit connection with the underlying rail segment.

Accordingly, although each of the referenced inventions achieves its own unique objective, all suffer from common drawbacks. Namely, the use of continuous electrical rails dramatically increases the possibility of damage from lightening strikes. Moreover, if struck, the severity of the resulting damage is far greater. Yet another problem associated with electric powered vehicles is the cost of providing a continuous set of electrified rails along every foot of the roadway. Continuous electrified rails consume large amounts of energy and are inefficient. The present invention is aimed at overcoming these deficiencies.

SUMMARY OF THE INVENTION

It is therefore one of the objects of this invention to provide an electrically powered vehicle that is powered from discrete and discontinuous electrical contacts embedded at spaced distances along a roadway.

It is an additional object of this continuation to use intermittent charging stations, in lieu of continuous charged electric rails, to thereby provide increased lightening protection to the intermittent power source as well as the vehicle being charged.

It is another object of this invention to provide an electrically powered vehicle that is equipped with a bank of high capacity high voltage capacitors to enable the vehicle's batteries to be quickly and efficiently charged.

Still yet another object of this invention is to provide an electrically powered vehicle with a rapidly charging battery or capacitor which is secondary to a larger battery.

It is a further object of this invention is to open the electrical circuit between the battery and capacitor during the charging process to minimize damage in the event of a lightening strike or power surge.

These and other objective are achieved by providing a system consisting of a high voltage distribution line, transformers, and capacitors, or some equivalent electronic storage devices or circuits in lieu of capacitors. When there is no vehicle traveling over a charging station the circuit between the distribution cable and transformer is open, the circuit between the capacitor and charging rail is open, and the circuit between the charging rail and ground is closed.

The system further includes a charging station with a length that is no greater than one third of the length of the vehicle. In accordance with the system, contact between vehicle and rail begins only after the front of the vehicle has covered the entire charging station. As the vehicle approaches a charging station the circuit between power supply and transformer closes. This begins the process of building up charge on the charging capacitors. Just as the vehicle charge receiver gets to the charging rail the circuit between the rail and ground is opened, and the circuit between rail and charging capacitors is closed. The vehicle receives the intermittent charge, as the vehicle contactor reaches the end of the charging rail the circuit between the rail and capacitors, and the circuit between transformers and power supply opens and the circuit between charging rail and ground closes.

Thus, by way of the present system, not only is the charging rail providing intermittent charge to a vehicle, but the charging rail itself receives an intermittent charge from the power feed only as the vehicle completely conceals the charging rail. While the vehicle is passing over the charging rail the vehicle is protecting the rail because it will be built to provide the benefits of a "faraday cage" which keeps passengers safe inside an automobile. The vehicle being charged will have a built in path to ground. Therefore, while the vehicle is being charged it is providing lightning protection to the high voltage activity taking place beneath it. As quickly as the vehicle moves away from the charging rail all circuits involved open or close as prescribed.

The ground for the charging rail closes so any remaining charge on the charging rail is dissipated. This is a safety precaution to prevent anyone from getting electrocuted by a residual charge on the charging rail. The circuit between the high voltage electrified roadway feed capacitor and the rail segment opens. This does two things, first, it protects the entire upstream high voltage capacitors, transformers, and transmission lines from damage in the event lightning strikes the exposed charging rail segment. Second, it makes certain no more high voltage charges are sent to the charging rail segment. Such high voltages would make the charged rail segment a very attractive target for lightning.

The foregoing has outlined rather broadly the more pertinent and important features of the present invention in order that the detailed description of the invention that follows may be better understood so that the present contribution to the art can be more fully appreciated.

Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method and apparatus for charging electrically powered devices. In accordance with the invention, the device is powered by two storage or charge receiving devices. One of these devices is capable of receiving a substantial charge very rapidly while the other device requires a longer time to receive a charge. The advantage is that the powered device can be used almost instantly and continually while at the same time rebuilding electrical charge. The present invention further relates to a system for protecting the charging device from being damaged from an electrical surge, such as from a lightening strike.

Electric Vehicles and Charging Stations

Figure 1:
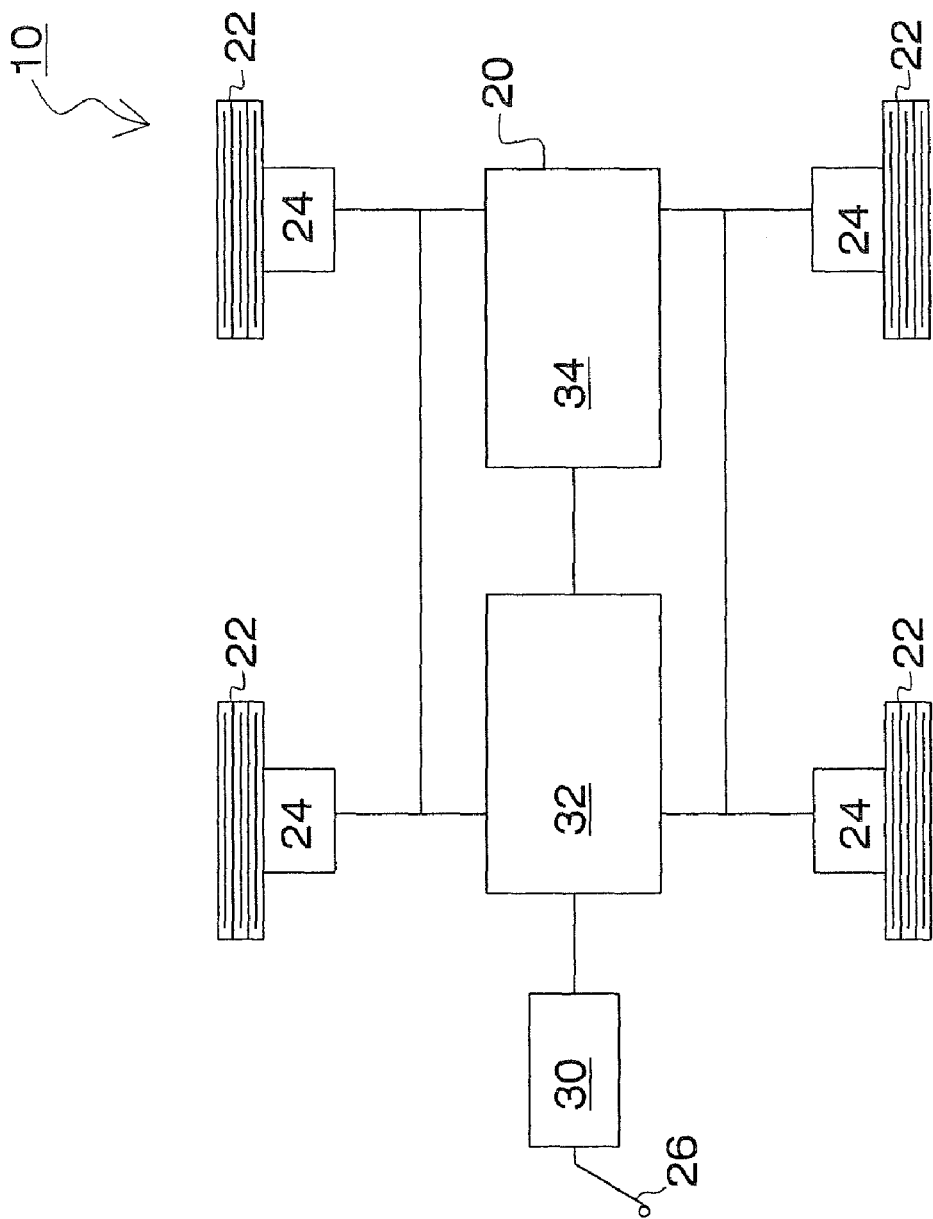
FIG. 1 is a schematic representation of a vehicle constructed in accordance with the subject invention.

FIG. 1 is a schematic diagram illustrating the various components of the primary embodiment 10 of the present invention. As illustrated, the invention relates to a vehicle 20 that includes four independently operating wheels 22. In the preferred embodiment, these wheels are each powered by independent electrical motors 24. An electrical power supply, described below, routs current to each of the motors to permit the independent rotation of each wheel 22. In the alternative, one single electric motor can be used to power all four wheels.

Figure 2:
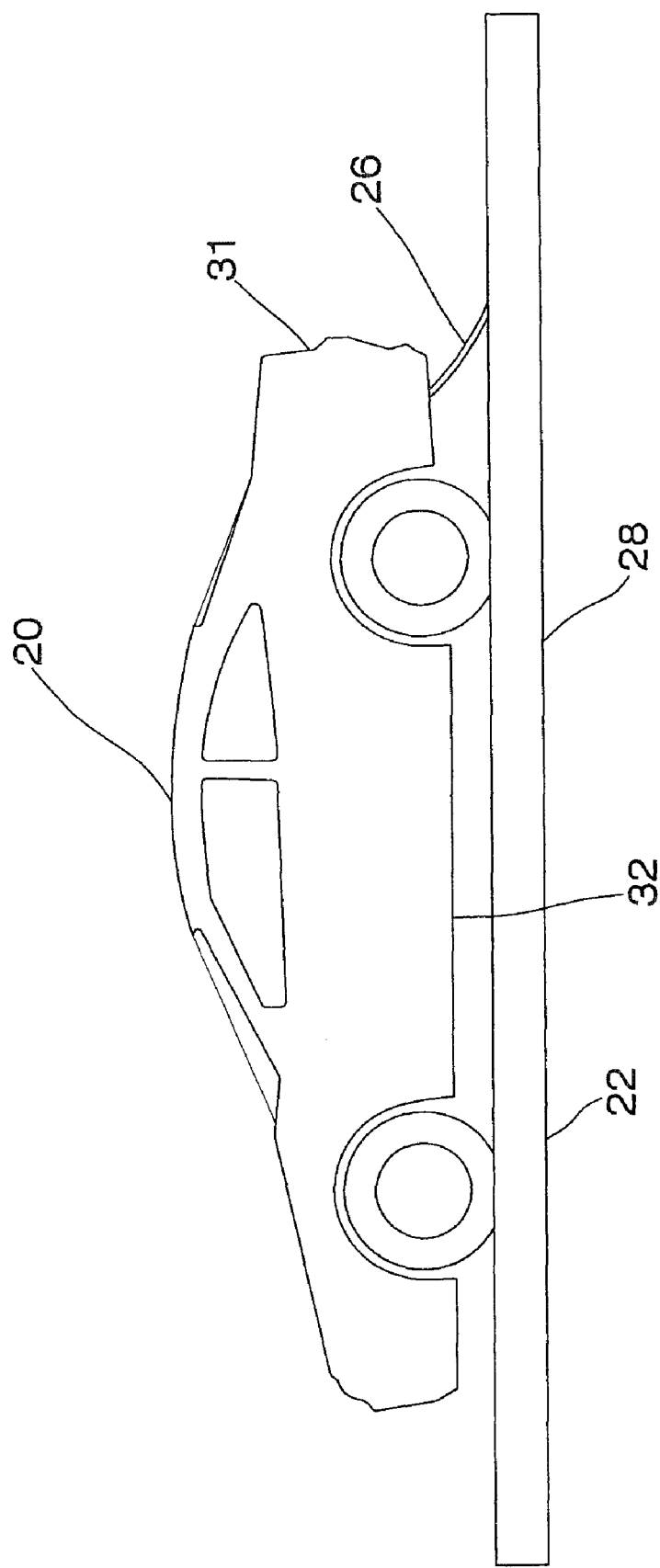
FIG. 2 is a side elevational view of a vehicle and associated roadway surface constructed in accordance with the present invention.

With continuing reference to FIG. 1, it will be seen that the vehicle 20 further includes a contact pole 26 that extends downwardly from the rear of vehicle 20. Although this is the preferred location for contact pole 26, those of ordinary skill in the art will appreciate that pole 26 can be positioned at other locations around vehicle 20. A retraction assembly 30 is also provided for raising or lowering pole 26. Assembly 30 is such that it can selectively move contact pole 26 between a first stored orientation and a second deployed orientation. In the stored orientation, pole 26 is preferably located within the body of vehicle 20. FIG. 2 illustrates contact pole 26 in its second deployed orientation. In this orientation, pole 26 preferably extends down far enough to make contact with roadway 28.

The batteries of the vehicle are described next in conjunction with FIG. 1. The vehicle is ideally supplied with one device for rapidly receiving charge 32 and one or more longer charge storage batteries 34. Devices that can be rapidly charged generally suffer from the fact that they also quickly dissipate charge and, therefore, are not ideal for prolonged electrical storage. Conversely, slower charging batteries are generally capable of storing electrical charge for prolonged periods of time but also take longer to accumulate a sufficient charge.

In one preferred embodiment, device 32 is a bank of high capacity high voltage capacitors that are capable of being fully charged in as little as 30 seconds. Those of ordinary skill in the relevant art will appreciate suitable high voltage capacitors that will suffice for this purpose. Furthermore, device 34 is any suitable storage battery. One acceptable storage battery is an advanced ultra thin organic radical polymer battery ("ORB"). Other organic polymer batteries will also suffice for this purpose. For example, U.S. Pat. No. 4,869,979 to Ohtani et. al. discloses the general construction for a organic polymer batter that may be employed in conjunction with the present invention.

Figure 3:
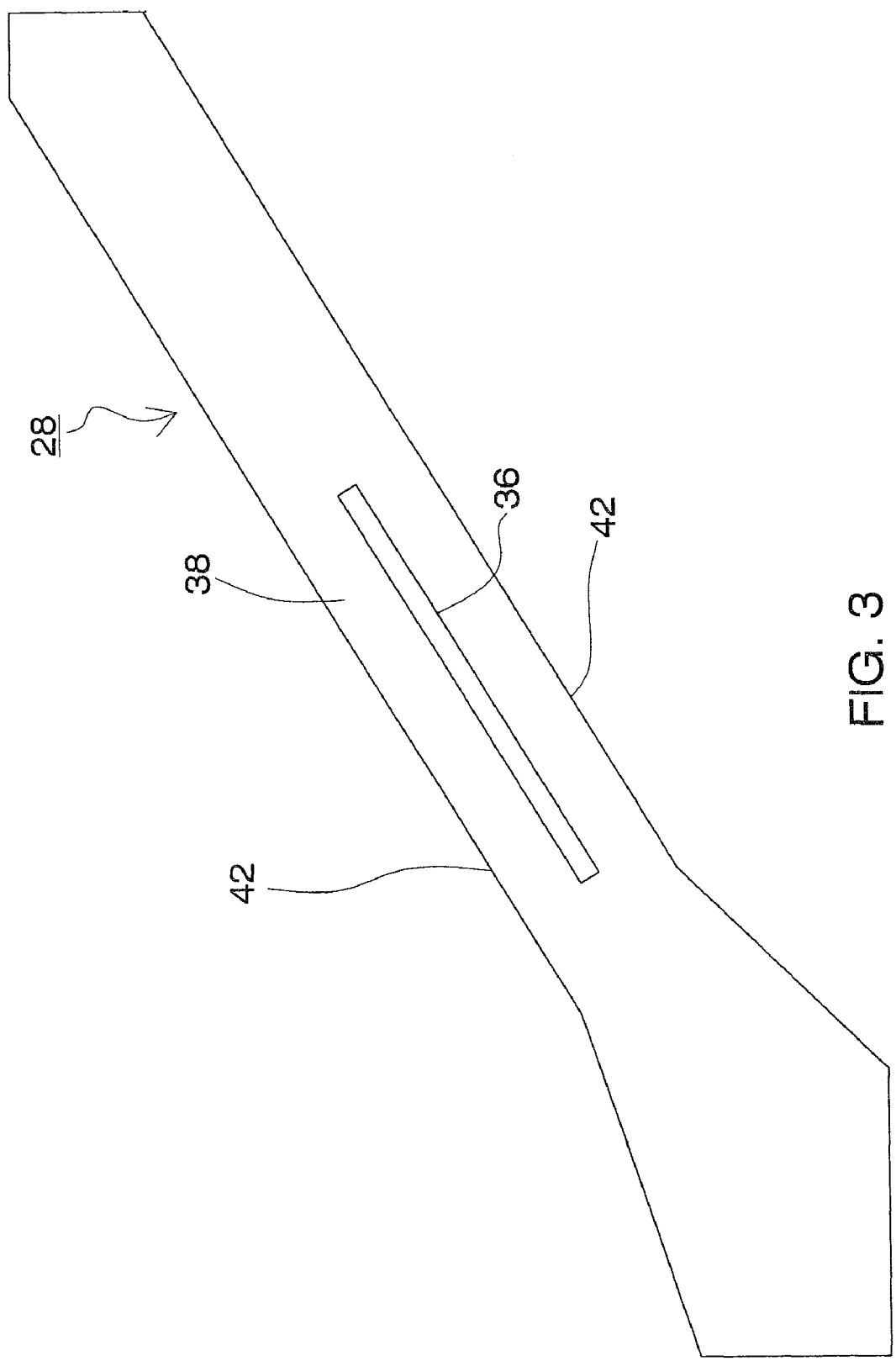
FIG. 3 is a perspective view of a roadway constructed in accordance with the present invention.

The roadway 28 forms another component of this inventive system. As illustrated in FIGS. 2 and 3, the roadway 28 includes a series of discrete and embedded electrical conductors 36 which are each positioned within corresponding slots 38. The conductors 36 are discrete in that the present invention obviates the need for a continuous electrical conductor of a substantial length. Rather, the system 10 of the present invention can be carried out with electrical strips 36 of a foot or so in length. The distance between successive conductive strips 36 is indicated by reference "D" in FIG. 4. This distance can be several feet or yards in length.

Figure 4:
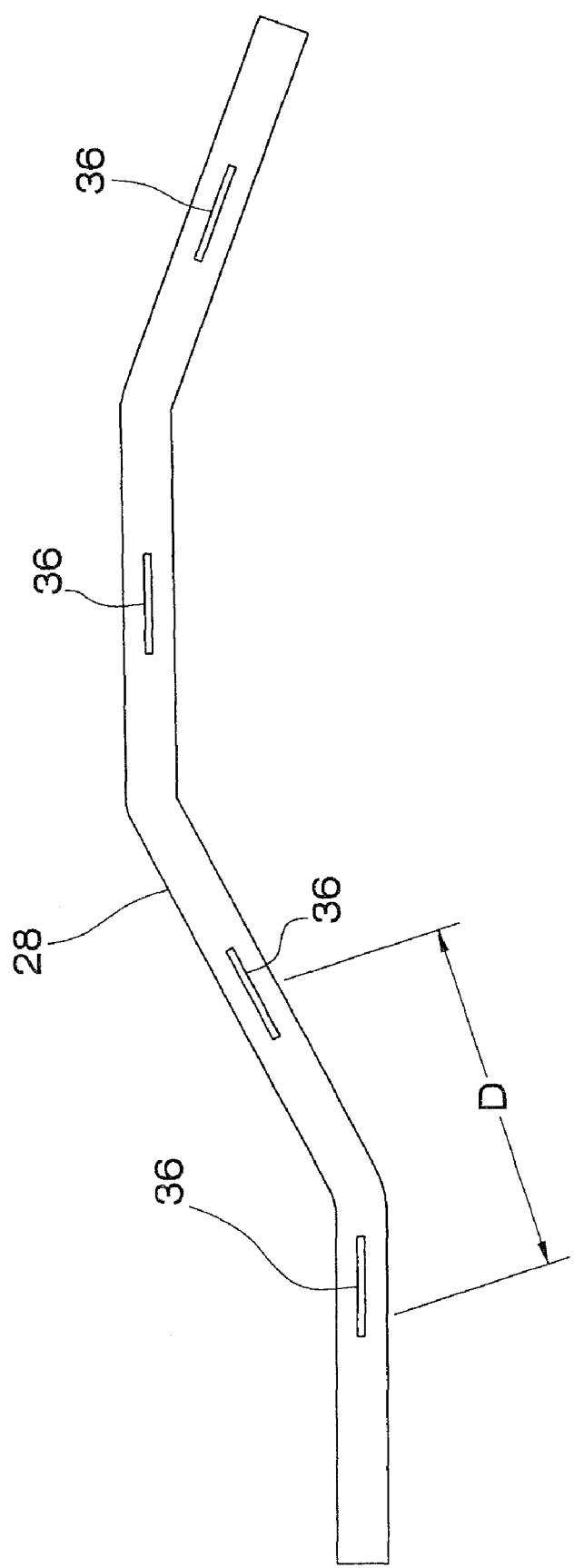
FIG. 4 is a perspective view of a roadway constructed in accordance with the present invention.

A series of several strips would constitute a single charging station. FIG. 4 is a depiction of a single charging station. The distance between successive stations could be several miles. The capacity of the storage battery 34 chosen will depend, in part, on the average distance between these charging stations.

The individuals conductors 36 that make up a charging station can be interconnected via a common ground wire for the purpose of delivering a suitable electric charge. Alternatively, each strip 36 can be interconnected to its own power source.

In use, and as shown in FIG. 2, as vehicle 20 is traveling down the road, contact pole 26 can be placed into the extended orientation by the driver. In this orientation, when the driver drives over conductors 36, contact pole 26 will dip down into slot 38. Contact pole 26 preferably includes a slight curve to bring it in contact with conductor 36. Both the high voltage capacitors 32 and the storage batteries 34 can be charged during this contact. When the vehicle leaves the charging station the driver can retract the contact pole 26. During the charging process, capacitors 32 charge first. Thus, being at the higher voltage, the capacitors 32 then transfer most of their electric charge to the storage batteries 34. This transfer can occur with pole 26 in either its extended or retracted orientation. After traveling a few thousand feet or a few miles the vehicle 20 can again travel over into a charging lane as shown in FIG. 3. The design of the lane directs the vehicle into position for the contact pole 26 to again drop down into the charging trench 38. Raised lane guides 42 may be included for guiding a vehicle 20 into the charging area.

The process of charging capacitors 32, and then having the capacitors 32 charge the storage batteries 34, continues until the batteries 34 are full. As vehicle 20 moves along it will use electricity which will deplete storage batteries 34. When batteries 34 are sufficiently depleted, vehicle 20 can again enter a charging station. Here, vehicle 20 will again get re-supplied as pole 26 contact conductors 36 in the roadway 28. This contact will charge capacitors 32, which in turn, will charge the storage batteries 34.

Capacitors 32 could also be charged by another capacitors in the roadway. The onboard capacitors 32 could also be used to accelerate the vehicle 20 from stop or to a higher velocity faster than could the storage batteries 34. The vehicle 20 can operate at higher speeds thereby depleting the battery faster by knowing the battery is being recharged repeatedly without stopping. This method could also be used to reduce the number of batteries thereby reducing the cost and weight of vehicles.

Thus, the present invention is directed to a method of repeatedly recharging an electric powered vehicle without stopping by receiving a very rapid supply of electric energy from a vehicle contact with the road that thereby rapidly charges an onboard set of capacitors (or other such device such as a fuel cell) While the vehicle continues in motion, the capacitors (or other such device such as a fuel cell) charge the batteries and could also, if desired, provide electric direct to the motors until all its energy is released. Soon the vehicle is receiving another electric charge, the capacitors are filled and the batteries are charged again.

This process continues as an ongoing process. When a vehicle such as this stops then the contact pole will make contact with an electric supply provided and both the capacitor and battery are charged simultaneously while parked.

The present invention also relates to an electrified roadway that is electrified to provide electric to vehicles upon contact only on an intermittent basis. Instead of providing continuous electrified rails, overhead cables, or wires in a road bed running for miles, the electric roadway may have electric contact power supply rails, or wires ranging from a few inches or less on up to several hundred feet but with non-electrified roadbed running for thousands of feet or several miles between these electric contact power supply in the road as noted in FIG. 4. It is understood the contact and transmission of electric between roadway and vehicle could be accomplished in numerous ways.

It is understood, and it is also a claim of this invention, that an electric powered vehicle could be provided with no capacitors but have rapidly charging batteries. Presently some batteries can be fully charged in 30 seconds. This means a vehicle would be charged while in motion and the roadbed could be intermittently electrified, but the vehicle would need to remain in contact with the roadbed for a much longer time.

Surge and Lightening Protection

An additional aspect of the invention relates to protecting the vehicle and the charging station from the adverse effects of a lightening strike and/or power surge. The surge protection system is disclosed in connection with the electric vehicle 52 depicted in FIG. 5. As in the primary embodiment, vehicle 52 is driven by separate electric motors 82 built into each wheel. In normal operation, the electric motors 82 receive electric power from a set of rapid charge batteries 56 (such as ultra thin organic radical polymer).

Batteries 56, in turn, are intermittently charged by high capacity, high voltage capacitors 54 (or circuits which accomplish the same result) that are also on board vehicle 52. The vehicle receives its electricity from an electrified intermittent rail segment 64 that may also be referred to as a "charging station" or simply as the "rail segment." Rail segment 64 itself is not charged when there is no vehicle passing over it. If rail segment 64 was continuously charged regardless of the presence of a vehicle, it would present a strong attraction for lightning. It would also be a safety hazard to anyone who happened to come in contact with it.

In order to facilitate the intermittent charging of rail segment 64, a closed grounding circuit 92 and switch 94 regulate the current flow to rail 64. Rail segment 64 further includes a high voltage feed capacitors 74 and an up-charge transformer 72 built into the roadway. These devices are also regulated to stop the current flow when rail 64 is inactive. The feed capacitor 74 and the up-charge transformer 72 together provide the high voltage charge from the high voltage transmission/distribution lines 66 that bring power directly from a generating station. Turning these devices off during periods of inactivity saves energy and prevent overheating.

In use, a signal is sent to rail segment 64 when the vehicle 52 gets within a specified distance. This can be achieved via an RFID signal, radio signals, or a GPS receiver. Once the signal is received, a switch 86 closes a circuit 68 to put transmission/distribution lines 66 into electrical communication with the up-charge transformer 72. This allows the roadway feed capacitors 74 to begin charging. Vehicle 52 then subsequently passes over the rail segment 64. Thereafter, when the entire rail segment 64 is under vehicle 52 several circuits are triggered. This can be achieved via an RFID sensor or contact switch. Once activated, switch 94 opens up a ground circuit 92. Additionally, switch 88 closes circuit 76. Circuit 76, in turn, connects roadway feed capacitors 72 to rail segment 64.

Next, as the vehicle mounted contact brush 62 approaches rail segment 64, switch 84 opens the energy transfer circuit 58 that connects the vehicle mounted capacitors 54 to the onboard vehicle batteries 56 and motors 82. As all of this happens vehicle batteries 56, electric motors 82 (and associated control circuits) are protected from lightning strikes and power surges. Moreover, rail segment 64 is isolated from the ground so it can receive and hold a charge. Rail segment 64 also becomes completely protected from lightning because it is completely covered by vehicle 52. Thus, in the event vehicle 52 was hit, it relies upon the "faraday cage" effect to harmlessly divert the lightning to the ground.

As the vehicle continues forward the vehicle mounted contact brush 62 loses contact with the rail segment 64. As a result, switch 84 closes to permit circuit 58 to download high voltage through appropriate circuits that step voltage down from the capacitors 54 to the batteries 56. Additionally, switch 86 of circuit 72 opens to cease electrical communication between transmission/distribution lines 66 and transformer 72. Switch 88 also opens on circuit 76 so the capacitors 72 are prevented from sending more charge to rail segment 64. Finally, switch 94 closes on ground circuit 92 so the rail segment 64 can dissipate any residual charge.

When the vehicle is parked batteries 56 and capacitors 54 can be charged. When vehicle 52 is moving from 0 mph to 120 mph there is a need for strong acceleration. To accomplish this, rail segment 64 could be temporarily replaced with a longer more traditional electrified rail and the batteries 56 and onboard capacitors 54 could be bypassed to feed power directly from the rail to the electric motors. When vehicle 52 is faced with a steep uphill grade rail segments 64 can be placed much closer together and the capacitors 54 can bypass batteries 56 to thereby feed a stronger electric supply to the electric motors 82 so vehicle 52 can climb a much steeper grade than it could otherwise do with just the direct battery power.

In the event there is an electric power failure, a blackout, the generating station loses power, there is a short circuit in a system, there is a failure of the energy storing devices on board an individual vehicle, there needs to be a backup power supply on board each vehicle to prevent system disruption or shutdown.

Figure 5:
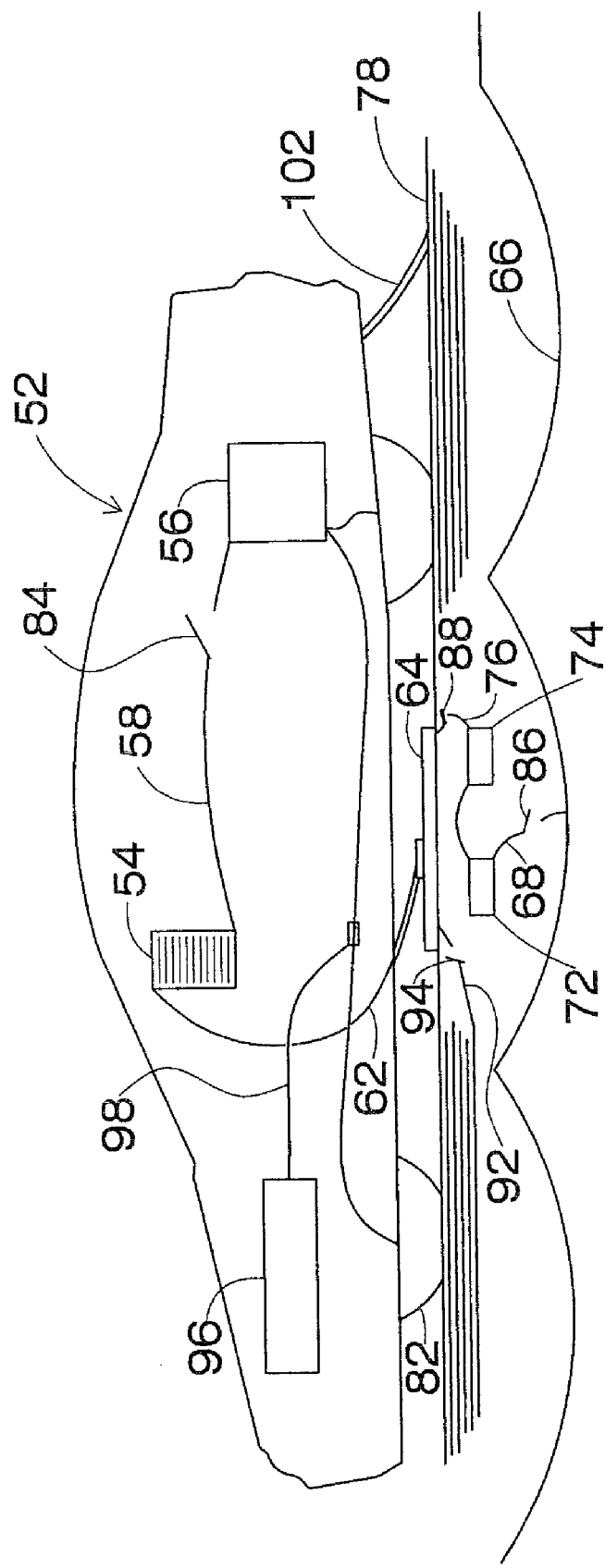
FIG. 5 is a sectional view of an alternative embodiment of the system of the present invention.

FIG. 5 shows vehicle 52 equipped with high capacity capacitors 54, and a rapid charge battery 56 and all the related equipment, but it also has fuel cells a hybrid internal gasoline, diesel or bio fuel powered combustion engine 96 that drives a generator that supplies sufficient power through circuit 98 to the electric motors 82. This allows individual vehicles and system as a whole to continue to operate during a power failure or emergency of any sort such as a storm, it has the additional benefit that vehicle 52 can operate for extended distances when vehicle 52 is not on the electrified roadway. This increases the flexibility and usefulness of the vehicle.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A system for protecting an electrically charged vehicle from a power surge, the system comprising: an electrically powered vehicle having a length and four wheels, each wheel being powered by a separate electric motor, the motors being powered by both a capacitor and a battery; a contact brush for delivering current to the capacitor, an energy switch for selectively opening or closing circuit between the capacitor and battery; a charging station including a rail segment, the rail segment being approximately ⅓ of the length of the electrically powered vehicle; a ground circuit and a ground switch for selectively connecting the rail segment to ground; an up-charge transformer, a feed capacitor, a power line, the up-charge transformer and feed capacitor being electrically coupled to one another, a first switch for selectively completing circuit between the power line and the up-charge transformer, a second switch for selectively completing circuit between the feed capacitor and the rail segment; first and second sensors, the first sensor being activated when the vehicle is at a predetermined distance from the charging station, activation of the first sensor closing the first switch to permit charging of the up-charge transformer, the second sensor detecting when the rail segment is completely underneath the electrically powered vehicle, activation of the second sensor opening the ground circuit to disconnect the rail segment from ground and closing the second switch to connect the rail segment to the feed capacitor and thereby power the rail, activation of the second sensor further opening the energy switch to disconnect the capacitor and battery so as to protect the battery from damage in the event of a power surge.

2. A system for protecting an electrically charged vehicle from a power surge, the system comprising: an electrically powered vehicle, the vehicle powered by both a capacitor and a battery; a contact brush for delivering current to the capacitor, an energy switch for selectively opening or closing a circuit between the capacitor and battery; wherein a feed capacitor and up-charge transformer connect the rail segment to the power line and further wherein a first switch selectively couples up-charge transformer to the power line and a second switch selectively couples the feed capacitor to the rail segment; a charging station including a rail segment and a power line, a switch for selectively completing circuit between the power line and the rail segment; a sensor, the sensor detecting the relative position between the vehicle and charging station, activation of the sensor closing the switch to permit charging of the rail segment by the power line, activation of the first sensor further opening the energy switch to disconnect the capacitor and battery so as to protect the battery from damage in the event of a power surge.

3. The system as described in claim 2 wherein the rail segment is approximately ⅓ the length of the vehicle and wherein the rail segment is only powered when the vehicle is completely covers the rail segment.

4. The system as described in claim 2 wherein the charging station further includes a ground circuit and wherein the rail segment is grounded when the vehicle is outside of the charging station.

5. A method for protecting an electrically charged vehicle from a power surge, the vehicle including a battery and a capacitor that are selectively connected via a energy switch, the method employing a series of charging stations with each charging station including a rail segment, a power line, and a switch for selectively coupling the rail segment and power line, the method comprising the following steps:

closing the energy switch to power the vehicle by both the battery and capacitor;

driving the electric vehicle between successive charging stations;

detecting when vehicle is completely over a charging station and thereafter;

closing the switch between the rail segment and power line to thereby permit charging of the rail segment by the power line;

opening the energy switch to disconnect the capacitor and battery so as to protect the battery from damage in the event of a power surge.

\* \* \* \* \*